US012716245B2

(12) United States Patent
Xu et al.

(10) Patent No.: US 12,716,245 B2
(45) Date of Patent: Aug. 25, 2026

(54) INORGANIC AGGREGATE POLYURETHANE (PU) TERRAZZO FLOORING, AND PREPARATION METHOD AND USE THEREOF

(71) Applicant: SHANGHAI YANHUANG ENVIRONMENTAL TECHNOLOGY CO., LTD., Shanghai (CN)

(72) Inventors: Xinhua Xu, Shanghai (CN); Ping Liu, Shanghai (CN)

(73) Assignee: Shanghai Yanhuang Environmental Technology Co., Ltd., Shanghai (CN)

( * ) Notice: Subject to any disclaimer, the term of this patent is extended or adjusted under 35 U.S.C. 154(b) by 240 days.

(21) Appl. No.: 18/723,571

(22) PCT Filed: Dec. 23, 2022

(86) PCT No.: PCT/CN2022/141362
§ 371 (c)(1),
(2) Date: Jul. 29, 2024

(87) PCT Pub. No.: WO2023/116876
PCT Pub. Date: Jun. 29, 2023

(65) Prior Publication Data

US 2025/0059776 A1 Feb. 20, 2025

(30) Foreign Application Priority Data

Dec. 24, 2021 (CN) ........................ 202111602558.3

(51) Int. Cl.

| | |
|---|---|
| ***C04B 26/16*** | (2006.01) |
| ***C09D 175/04*** | (2006.01) |
| ***E04F 15/12*** | (2006.01) |

(52) U.S. Cl.
CPC ............ *E04F 15/126* (2013.01); *C04B 26/16* (2013.01); *C09D 175/04* (2013.01)

(58) Field of Classification Search
CPC ................................ C09D 175/04; C08K 3/40
See application file for complete search history.

(56) References Cited

FOREIGN PATENT DOCUMENTS

| | | |
|---|---|---|
| CN | 109184147 A | 1/2019 |
| CN | 109320136 A | 4/2021 |

(Continued)

OTHER PUBLICATIONS

Machine translation of CN 113549389 A (Year: 2022).*

(Continued)

*Primary Examiner* — Ramsey Zacharia
(74) *Attorney, Agent, or Firm* — M&B IP Analysts, LLC

(57) ABSTRACT

Provided are an inorganic aggregate polyurethane (PU) terrazzo flooring, and a preparation method and use thereof. The inorganic aggregate PU terrazzo flooring includes a PU substrate layer, an inorganic aggregate PU terrazzo layer, and a PU transparent surface layer from inside to outside in sequence; where the inorganic aggregate PU terrazzo layer is prepared by paving a polyol PU self-leveling coating, a diisocyanate curing agent, and an inorganic aggregate at a mass ratio of 1:1.25:6; the inorganic aggregate is selected from the group consisting of recycled glass, a marble powder, and stone that are regularly shaped; and the polyol PU self-leveling coating includes a polyol PU resin and a functional additive at a mass ratio of 19:1.

8 Claims, 1 Drawing Sheet

(56) References Cited

FOREIGN PATENT DOCUMENTS

| | | | |
|---|---|---|---|
| CN | 213174625 | U | 5/2021 |
| CN | 113480930 | A | 3/2022 |
| CN | 114319779 | A | 4/2022 |
| CN | 113549389 | A | 6/2022 |
| JP | 2000007985 | A | 1/2000 |
| JP | 2008297181 | A | 2/2012 |
| WO | WO2023116876 | A1 | 6/2023 |

OTHER PUBLICATIONS

First Office Action for application No. 202111602558.3, dated Nov. 29, 2023, Issued by the State Intellectual Property Office of People's Republic of China.
International Search Report for PCT/CN2022/141362, dated Feb. 27, 2023, issued by Beijing, China 100088.
Second Office Action for application No. 202111602558.3, issued on Jun. 7, 2024, issued by the State Intellectual Property Office of People's Republic of China.
Written Opinion of the International Searching Authority, dated Feb. 27, 2023, issued by Beijing, China 100088.

* cited by examiner

INORGANIC AGGREGATE POLYURETHANE (PU) TERRAZZO FLOORING, AND PREPARATION METHOD AND USE THEREOF

CROSS REFERENCE TO RELATED APPLICATION

The present application is a national stage application of International Patent Application No. PCT/CN2022/141362, filed on Dec. 23, 2022, which claims priority to the Chinese Patent Application 2021116025583, filed with the China National Intellectual Property Administration (CNIPA) on Dec. 24, 2021. The disclosure of the two applications is incorporated herein by reference in their entirety.

TECHNICAL FIELD

The present disclosure belongs to the technical field of building materials, and in particular relates to an inorganic aggregate polyurethane (PU) terrazzo flooring, and a preparation method and use thereof.

BACKGROUND

Flooring refers to a floor that has certain decorative and functional properties and is produced by using specific materials and processes to construct an original floor. The flooring includes epoxy self-leveling flooring, corundum wear-resistant flooring, epoxy terrazzo flooring, cement-based terrazzo flooring, epoxy colored sand flooring, epoxy anti-static flooring, epoxy anti-slip flooring, polyurea anti-corrosion flooring, polyurethane (PU) flooring, silicon PU flooring, and concrete sealing and curing agent flooring.

Terrazzo made with epoxy adhesive is also called epoxy terrazzo or organic terrazzo. According to construction and production processes, the terrazzo is divided into in-situ casting terrazzo and prefabricated panel-based terrazzo. However, the commonly used terrazzo flooring has the following defects:

(1) a substrate material is generally rigid cement or thermosetting epoxy resin, which has high inherent rigidity/brittleness and is prone to cracking due to environmental changes and uneven stress;

(2) the high hardness leads to poor flexibility in indoor public places, affecting the comfort experience and easily causing noise pollution; and (3) the product is not renewable.

SUMMARY

In view of the above deficiencies of the prior art, an object of the present disclosure is to provide an inorganic aggregate PU terrazzo flooring. In the present disclosure, a polyol PU self-leveling coating is compounded with an inorganic aggregate for public place flooring, thus meeting the requirements for high strength, toughness, and cracking resistance while having the function of sound insulation and noise reduction.

Another object of the present disclosure is to provide a method for preparing the inorganic aggregate PU terrazzo flooring as mentioned above, where the method has a simple process and is easy to achieve large-scale construction.

Another object of the present disclosure is to provide use of the inorganic aggregate PU terrazzo flooring as mentioned above in a flooring of a public place related to medical treatment, education, office, entertainment, or retail.

To achieve the above objects, the present disclosure adopts the following technical solutions:

The present disclosure provides an inorganic aggregate PU terrazzo flooring, including a PU substrate layer, an inorganic aggregate PU terrazzo layer, and a PU transparent surface layer from inside to outside in sequence, where the PU substrate layer has a thicknesses of 0.5 mm, and the PU transparent surface layer has a thicknesses of 0.1 mm;

the inorganic aggregate PU terrazzo layer has a thickness of 10 mm to 50 mm and a density of 1.6 kg/m$^2$/mm to 2 kg/m$^2$/mm, and the inorganic aggregate PU terrazzo layer is prepared by paving a polyol PU self-leveling coating, a diisocyanate curing agent, and an inorganic aggregate at a mass ratio of 1:1.25:6; where the inorganic aggregate is one or a combination of two or more selected from the group consisting of recycled glass, a marble powder, and stone that are regularly shaped; and the polyol PU self-leveling coating includes (or consists of) 95% of a polyol PU resin and 5% of a functional additive by mass percentage, the polyol PU resin including (or consisting of) 45% to 50% of a plant polyol, 40% to 45% of a diisocyanate, and 5% to 15% of a pigment by mass percentage, and the functional additive including (or consisting of) a leveling agent, a defoamer, and a wetting agent at a mass ratio of 1:1:0.5.

In some embodiments, the PU substrate layer is in an amount of 0.4 kg/m$^2$, and the PU substrate layer is prepared by scraping or tape casting a polyol PU primer including (or consisting of) 60% of the polyol PU resin, 20% of water, and 20% of a curing agent by mass percentage.

In some embodiments, the inorganic aggregate PU terrazzo layer has a thickness of 20 mm, and the inorganic aggregate PU terrazzo layer is in an amount of 32 kg/m$^2$ to 40 kg/m.

In some embodiments, the PU transparent surface layer is in an amount of 0.03 kg/m$^2$ to 0.06 kg/m$^2$, and the PU transparent surface layer is prepared by scraping or tape casting a water-based PU transparent topcoat; and the water-based PU transparent topcoat includes (or consists of) 35% to 55% of an aliphatic water-based PU resin, 1% to 2% of a functional additive, 15% to 25% of a curing agent, and 29% to 38% of deionized water by mass percentage, the functional additive including (or consisting of) a leveling agent, a defoamer, a wetting agent, and a foam stabilizer at a mass ratio of 1:1:1:1.

The present disclosure further provides a method for preparing the inorganic aggregate PU terrazzo flooring as mentioned above, including the following steps:

(a) grinding and cleaning a surface of a foundation to be decorated, and applying the polyol PU primer to a resulting surface of the foundation by scraping or tape casting to obtain the PU substrate layer;

(b) paving the polyol PU self-leveling coating, the diisocyanate curing agent, and the inorganic aggregate on a surface of the PU substrate layer obtained in step (a) according to the mass ratio, and then grinding and cleaning a surface of a resulting paved product to obtain the inorganic aggregate PU terrazzo layer; and (c) applying the water-based PU transparent topcoat to a surface of the inorganic aggregate PU terrazzo layer obtained in step (b) by scraping or tape casting, and then grinding and polishing a surface of a resulting product to obtain a water-based PU transparent surface layer.

The present disclosure further provides use of the inorganic aggregate PU terrazzo flooring as mentioned above in a flooring of a public place in the fields of an exhibition hall, medical treatment, education, office, entertainment, or retail.

Compared with the prior art, some embodiments of the present disclosure have the following beneficial effects:

(1) In some embodiments of the present disclosure, the inorganic aggregate PU terrazzo flooring includes a polyol PU resin and an inorganic aggregate that is regularly shaped, and has the following performance advantages: silence and noise reduction, seamless and anti-cracking properties, desirable physical and chemical resistance, solvent-free and environmental-friendly, long service life, high adhesion and toughness, anti-slip and wear-resistant, and a powder after grinding during the construction that can be recycled and does not affect the product quality.

(2) In some embodiments of the present disclosure, the inorganic aggregate PU terrazzo flooring formed by combining the polyol PU resin and the inorganic aggregate is a soundproof, seamless, and ergonomic noise-reduction flooring system with a beautiful and comfortable visual effect, and meets the requirements for high strength, toughness, and cracking resistance during use. The inorganic aggregate PU terrazzo flooring is also convenient in construction and later maintenance, and environmental-friendly and safe, can replace traditional inorganic terrazzo and organic epoxy terrazzo and has a desirable comprehensive performance.

(3) In some embodiments of the present disclosure, the inorganic aggregate PU terrazzo flooring is used in a flooring of an indoor public place in the fields such as medical treatment, education, office, entertainment and retail. The inorganic aggregate PU terrazzo flooring has a fire retardant property of B1 grade, a critical heat flux (CHF) of not less than 9.4 Kw/m$^2$ (a standard requires greater than 8.0 Kw/m$^2$), a smoke production of less than 147.2%×min (a standard requires less than 750%×min), and a flame tip height of less than 120 Fs(mm) within 20 s (a standard requires less than 150 Fs(mm)).

BRIEF DESCRIPTION OF THE DRAWINGS

Other features, objects, and advantages of the present disclosure will become more apparent by reading the detailed description of non-limiting embodiments with reference to the following accompanying drawings.

FIGURE shows a construction effect diagram of the ground in a public place according to an example of the present disclosure.

DETAILED DESCRIPTION OF THE EMBODIMENTS

To make the objects, technical solutions, and advantages of the embodiments of the present disclosure clearer, the technical solutions in the embodiments of the present disclosure will be described clearly and completely below. Apparently, the described examples are a part of, but not all of, the examples of the present disclosure. Based on the described examples of the present disclosure, all other examples obtained by those of ordinary skill in the art without inventive labour shall fall within the scope of the present disclosure.

The raw materials and additives such as water-based PU transparent topcoat, diisocyanate curing agent, and functional additives used in the following example were all commercially available products unless otherwise specified.

Example 1

This example provided an inorganic aggregate PU terrazzo flooring, consisting of a PU substrate layer, an inorganic aggregate PU terrazzo layer, and a PU transparent surface layer from inside to outside in sequence. The inorganic aggregate PU terrazzo layer had a thickness of 20 mm and a density of 1.8 kg/m$^2$/mm, and was prepared by paving a polyol PU self-leveling coating, a diisocyanate curing agent, and an inorganic aggregate at a mass ratio of 1:1.25:6. The inorganic aggregate was recycled glass that was regularly shaped. The polyol PU self-leveling coating consisted of 95% of a polyol PU resin and 5% of a functional additive by mass percentage. The polyol PU resin consisted of 45% of a plant polyol, 45% of a diisocyanate, and 10% of a pigment by mass percentage. The functional additive consisted of a leveling agent, a defoamer, and a wetting agent at a mass ratio of 1:1:0.5.

The PU substrate layer had a thickness of 0.5 mm, was in an amount of 0.4 kg/m$^2$ and was prepared by scraping or tape casting a polyol PU primer consisting of 60% of the polyol PU resin, 20% of water, and 20% of a curing agent by mass percentage.

The PU transparent surface layer had a thickness of 0.1 mm, was in an amount of 0.05 kg/m$^2$ and was prepared by scraping or tape casting a water-based PU transparent topcoat consisting of 50% of an aliphatic water-based PU resin, 2% of a functional additive, 18% of a curing agent, and 30% of deionized water by mass percentage. The functional additive consisted of a leveling agent, a defoamer, a wetting agent, and a foam stabilizer at a mass ratio of 1:1:1:1.

A method for preparing the inorganic aggregate PU terrazzo flooring was performed as follows:

(a) a surface of a foundation to be decorated was ground and cleaned, and the polyol PU primer was applied to a resulting surface of the foundation by scraping or tape casting to obtain the PU substrate layer;

(b) the polyol PU self-leveling coating, the diisocyanate curing agent, and the inorganic aggregate were paved on a surface of the PU substrate layer obtained in step (a) according to the mass ratio, and then a surface of a resulting paved product was ground and cleaned to obtain the inorganic aggregate PU terrazzo layer; and (c) the water-based PU transparent topcoat was applied to a surface of the inorganic aggregate PU terrazzo layer obtained in step (b) by scraping or tape casting, and then a surface of a resulting product was ground and polished to obtain a water-based PU transparent surface layer.

As shown in the FIGURE, the inorganic aggregate PU terrazzo flooring was used in a flooring of school classrooms or stadium. The inorganic aggregate PU terrazzo flooring has a fire retardant property of B1 grade, a critical heat flux (CHF) of not less than 9.4 Kw/m$^2$ (a standard requires greater than 8.0 Kw/m$^2$), a smoke production of less than 147.2%×min (a standard requires less than 750%×min), and a flame tip height of less than 120 Fs (mm) within 20 s (a standard requires less than 150 Fs (mm)). The inorganic aggregate PU terrazzo flooring is a soundproof, seamless, and ergonomic noise-reduction flooring system with a beautiful and comfortable visual effect, and meets the requirements for high strength, toughness, and cracking resistance during use. The inorganic aggregate PU terrazzo flooring is also convenient in construction and later maintenance, and environmental-friendly and safe.

What is claimed is:

1. An inorganic aggregate polyurethane (PU) terrazzo flooring, comprising a PU substrate layer, an inorganic aggregate PU terrazzo layer, and a PU transparent surface layer from inside to outside in sequence, wherein the PU substrate layer has a thicknesses of 0.5 mm, and the PU transparent surface layer has a thicknesses of 0.1 mm, the inorganic aggregate PU terrazzo layer has a thickness of 10 mm to 50 mm and a density of 1.6 kg/m$^2$/mm to 2 kg/m$^2$/mm, and the inorganic aggregate PU terrazzo layer is prepared by paving a polyol PU self-leveling coating, a diisocyanate curing agent, and an inorganic aggregate at a mass ratio of 1:1.25:6, wherein the inorganic aggregate is one or a combination of two or more selected from the group consisting of recycled glass, a marble powder, and stone that are regularly shaped; and the polyol PU self-leveling coating comprises 95% of a polyol PU resin and 5% of a functional additive by mass percentage, the polyol PU resin comprising 45% to 50% of a plant polyol, 40% to 45% of a diisocyanate, and 5% to 15% of a pigment by mass percentage, and the functional additive comprising a leveling agent, a defoamer, and a wetting agent at a mass ratio of 1:1:0.5.

2. The inorganic aggregate PU terrazzo flooring according to claim 1, wherein the PU substrate layer is in an amount of 0.4 kg/m$^2$, and the PU substrate layer is prepared by scraping or tape casting a polyol PU primer comprising 60% of the polyol PU resin, 20% of water, and 20% of a curing agent by mass percentage.

3. The inorganic aggregate PU terrazzo flooring according to claim 1, wherein the inorganic aggregate PU terrazzo layer has a thickness of 20 mm, and the inorganic aggregate PU terrazzo layer is in an amount of 32 kg/m$^2$ to 40 kg/m$^2$.

4. The inorganic aggregate PU terrazzo flooring according to claim 1, wherein the PU transparent surface layer is in an amount of 0.03 kg/m$^2$ to 0.06 kg/m$^2$, and the PU transparent surface layer is prepared by scraping or tape casting a water-based PU transparent topcoat; and the water-based PU transparent topcoat comprises 35% to 55% of an aliphatic water-based PU resin, 1% to 2% of a functional additive, 15% to 25% of a curing agent, and 29% to 38% of deionized water by mass percentage, the functional additive comprising a leveling agent, a defoamer, a wetting agent, and a foam stabilizer at a mass ratio of 1:1:1:1.

5. A method for preparing the inorganic aggregate PU terrazzo flooring according to claim 1, comprising the following steps:

(a) grinding and cleaning a surface of a foundation to be decorated, and applying a polyol PU primer to a resulting surface of the foundation by scraping or tape casting to obtain the PU substrate layer;

(b) paving the polyol PU self-leveling coating, the diisocyanate curing agent, and the inorganic aggregate on a surface of the PU substrate layer obtained in step (a) according to the mass ratio, and then grinding and cleaning a surface of a resulting paved product to obtain the inorganic aggregate PU terrazzo layer; and (c) applying a water-based PU transparent topcoat to a surface of the inorganic aggregate PU terrazzo layer obtained in step (b) by scraping or tape casting, and then grinding and polishing a surface of a resulting product to obtain the PU transparent surface layer.

6. The method for preparing the inorganic aggregate PU terrazzo flooring according to claim 5, wherein the PU substrate layer is in an amount of 0.4 kg/m$^2$, and the PU substrate layer is prepared by scraping or tape casting a polyol PU primer comprising 60% of the polyol PU resin, 20% of water, and 20% of a curing agent by mass percentage.

7. The method for preparing the inorganic aggregate PU terrazzo flooring according to claim 5, wherein the inorganic aggregate PU terrazzo layer has a thickness of 20 mm, and the inorganic aggregate PU terrazzo layer is in an amount of 32 kg/m$^2$ to 40 kg/m$^2$.

8. The method for preparing the inorganic aggregate PU terrazzo flooring according to claim 5, wherein the PU transparent surface layer is in an amount of 0.03 kg/m$^2$ to 0.06 kg/m$^2$, and the PU transparent surface layer is prepared by scraping or tape casting a water-based PU transparent topcoat; and the water-based PU transparent topcoat comprises 35% to 55% of an aliphatic water-based PU resin, 1% to 2% of a functional additive, 15% to 25% of a curing agent, and 29% to 38% of deionized water by mass percentage, the functional additive comprising a leveling agent, a defoamer, a wetting agent, and a foam stabilizer at a mass ratio of 1:1:1:1.

* * * * *